(12) United States Patent      (10) Patent No.: US 9,145,907 B2
Liang      (45) Date of Patent: Sep. 29, 2015

(54) PIPE CONNECTOR

(76) Inventor: Hsiutao Liang, Hsinchu (TW)

( * ) Notice: Subject to any disclaimer, the term of this patent is extended or adjusted under 35 U.S.C. 154(b) by 170 days.

(21) Appl. No.: 13/596,419

(22) Filed: Aug. 28, 2012

(65) Prior Publication Data

US 2014/0062081 A1     Mar. 6, 2014

(51) Int. Cl.
*E04G 5/06*      (2006.01)
*E04G 7/14*      (2006.01)
*F16B 7/04*      (2006.01)

(52) U.S. Cl.
CPC ............... *F16B 7/0486* (2013.01); *E04G 5/06* (2013.01); *E04G 7/14* (2013.01); *Y10T 403/349* (2015.01); *Y10T 403/42* (2015.01)

(58) Field of Classification Search
CPC ............. E04G 5/06; E04G 5/061; E04G 7/02; E04G 7/06; E04G 7/12; E04G 7/14; F16L 43/00; F16L 43/001; F16L 43/002; F16L 43/003; F16L 3/085; F16B 7/0486
USPC ........... 403/49, 169–172, 174, 176, 178, 205, 403/403; 248/62, 65, 230.1
See application file for complete search history.

(56) References Cited

U.S. PATENT DOCUMENTS

| | | | | |
|---|---|---|---|---|
| 2,523,785 A * | 9/1950 | Sereno | ............ | 403/188 |
| 2,888,072 A * | 5/1959 | Nicholas | ........ | 403/172 |
| 3,007,727 A * | 11/1961 | Ryan | ............. | 403/169 |
| 3,315,994 A * | 4/1967 | Rifken | .......... | 403/169 |
| 3,353,854 A * | 11/1967 | Hansen | .......... | 403/171 |
| 4,214,841 A * | 7/1980 | Hayashi | ........ | 403/188 |
| 5,248,119 A * | 9/1993 | Imura | .............. | 248/65 |
| 6,123,366 A * | 9/2000 | Kiriakopolos et al. | ....... | 285/61 |
| 7,062,836 B1 * | 6/2006 | Sorgi | ............ | 285/123.1 |
| 7,152,832 B2 * | 12/2006 | Wochnick | ........ | 248/74.3 |
| 7,784,744 B2 * | 8/2010 | Becker | .......... | 248/68.1 |
| 8,528,291 B2 * | 9/2013 | Allred et al. | ........ | 403/170 |
| 8,559,782 B2 * | 10/2013 | Cleofe et al. | ........ | 385/134 |
| 2005/0121559 A1 * | 6/2005 | King | .............. | 248/68.1 |
| 2010/0192506 A1 * | 8/2010 | Allred et al. | ....... | 403/170 |

* cited by examiner

*Primary Examiner* — Josh Skroupa
(74) *Attorney, Agent, or Firm* — Juan Carlos A. Marquez; Bacon & Thomas PLLC

(57) ABSTRACT

A pipe connector incorporates a main body, a first gripper and a second gripper; wherein the first gripper is installed on one end of the main body and the second gripper installed on the other end of the main body; and the first gripper and second gripper face different directions. The present invention can be used in conjunction with additional pipe connectors so as to increase the number of pipe combinations.

10 Claims, 20 Drawing Sheets

PIPE CONNECTOR

BACKGROUND OF THE INVENTION

1. Field of the Invention

The present invention relates to a pipe connector which fixes two pipes in relative positions.

2. Description of Prior Arts

Generally in the designs of structures of housing, scaffolding, green house, fence, shelving, and stall, pipes are used to reserve a path for wiring or drainage purpose.

To adopt designs of various constructions, each pipe is usually converged and staggered at a certain area. To avoid pipes impacting each other or with other structure due to shaking and result in pipe ruptures, pipe connectors (or pipe fittings) such as the one shown in FIG. 2 are installed at the converging position. The pipe connector 90 of the prior art shown in FIG. 2 is a 2-way pipe connector that comprises two inserts 901 and 902. Place pipes P1 and P2 respectively into the inserts 901 and 902 of pipe connector 90 to secure the positions of two pipes. The interval between P1 and P2 is thus fixed and formed as preset in FIG. 1 to avoid impact.

However, the pipe connector 90 of the prior art is in standard specification and can not be used to combine other number of pipes. As shown in FIGS. 3 and 4, to fix three pipes P1, P2, and P3, the pipe connector used must be the kind of three-way pipe connector 91 that comprises at least three inserts 911, 912, and 913; the foresaid two-way pipe connector 90 can not be applied. From here we know that to secure the positions of different quantities of pipes, the pipe connectors used must be with corresponding quantities of inserts. Moreover, the more the number of pipes to be secured and connected, the wider the derived patterns. In other words, patterns of pipe connectors to be prepared are more diverse.

It is known from the above, it is necessary to prepare various corresponding type of pipe connectors to connect different quantities of pipes. The fact that the constructor must carry various types of pipe connectors to the working site is indeed causing trouble to constructor or who is in charge of material preparation, and indirectly affect construction schedule. In addition, in response to variety of needs, the manufacturers produce various types of pipe connectors, resulting in inventory increase and relatively increase the cost of pipe connectors.

SUMMARY OF THE INVENTION

To overcome the existing problems of the prior art, the present invention discloses a pipe connector which does not require to design and manufacture pipe connectors with corresponding quantity of pipes. The trouble of material preparation can be reduced; also it reduces manufacturing cost and inventories.

The present invention discloses a pipe connector that comprises one main body, one first gripper and one second gripper; wherein the first gripper is installed on one end of the main body and the second gripper installed on the other end of the main body; and first gripper and second gripper face different directions.

The first gripper and second gripper of the present invention can respectively grip one pipe and keep the two pipes facing different directions. When there are three or more pipes to be gripped, two or more of present invention may be used to achieve the purpose of securing each pipe at certain position. The present invention complements each other to increase the number of pipe combination and does not require pipe connectors specially manufactured to correspond to other quantities. It is more convenient for the constructor to carry; and it also reduces the need for inventory and reduces cost.

Preferably, the include angle of axis of first gripper and second gripper is 90 degree to facilitate use of right angle connection.

Preferably, wherein the first gripper is arc-shaped and one lug extends from its end; the lug is with one opening to allow one fixation element to pass through and connect to the main body. Similarly, the second gripper is arc-shaped and one lug extends from its end; the lug is with one opening.

Preferably, the first gripper is polygonal and one lug extends from its end; the lug is with one opening. Similarly, the second gripper may be polygonal and with one lug extending from its end; the lug is with one opening.

Preferably, the main body is L-shaped and is easy to be manufactured and used.

Preferably, the first gripper and second gripper are respectively installed on the two ends of the L-shaped main body. Moreover, wherein the first gripper is formed curling upward from one end of the L-shape body. Similarly, the second gripper is formed curling upward from the other end of the L-shape body.

DETAILED DESCRIPTION OF THE PREFERRED EMBODIMENTS

Figure 9:
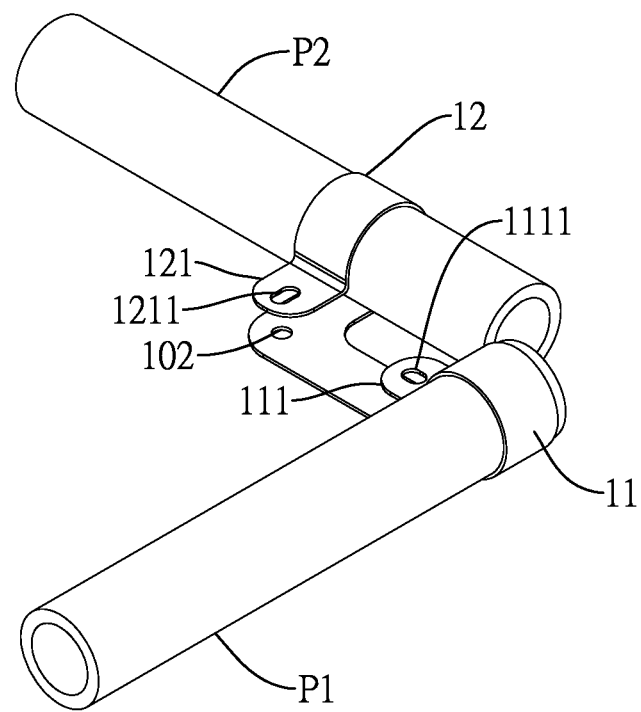
FIG. 9 is a schematic drawing of an embodiment of present invention.
Figure 10:
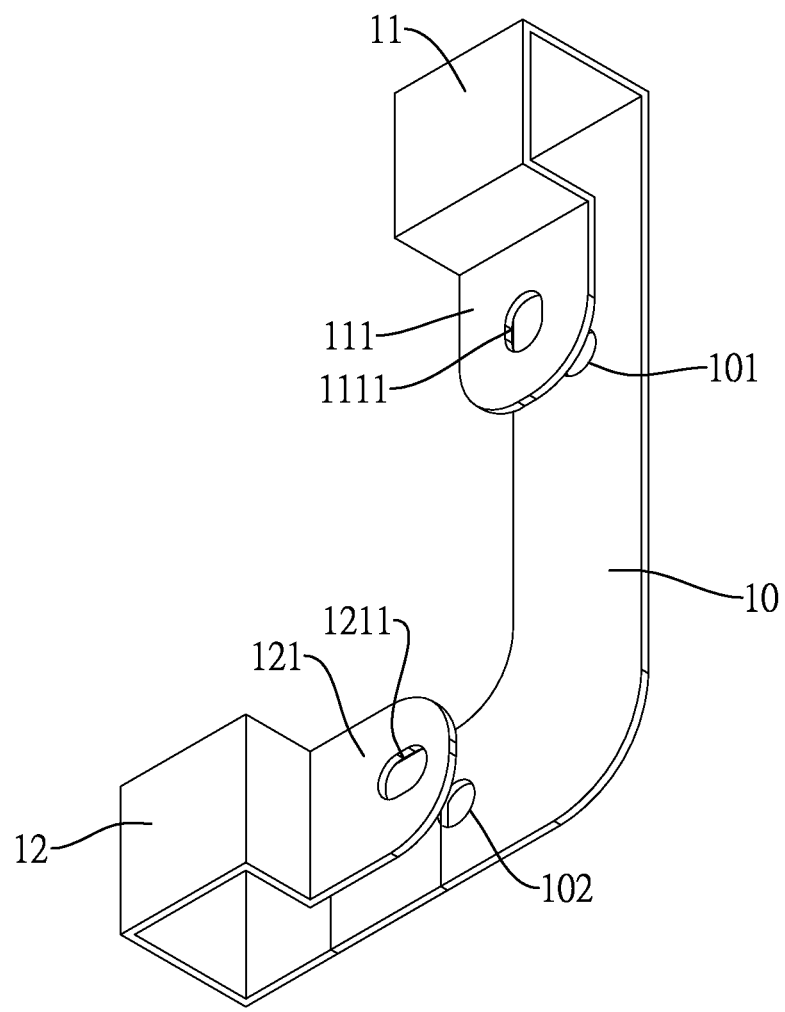
FIG. 10 is a three-dimensional view of the first gripper and second gripper of an embodiment of present invention in polygonal shape.
Figure 11:
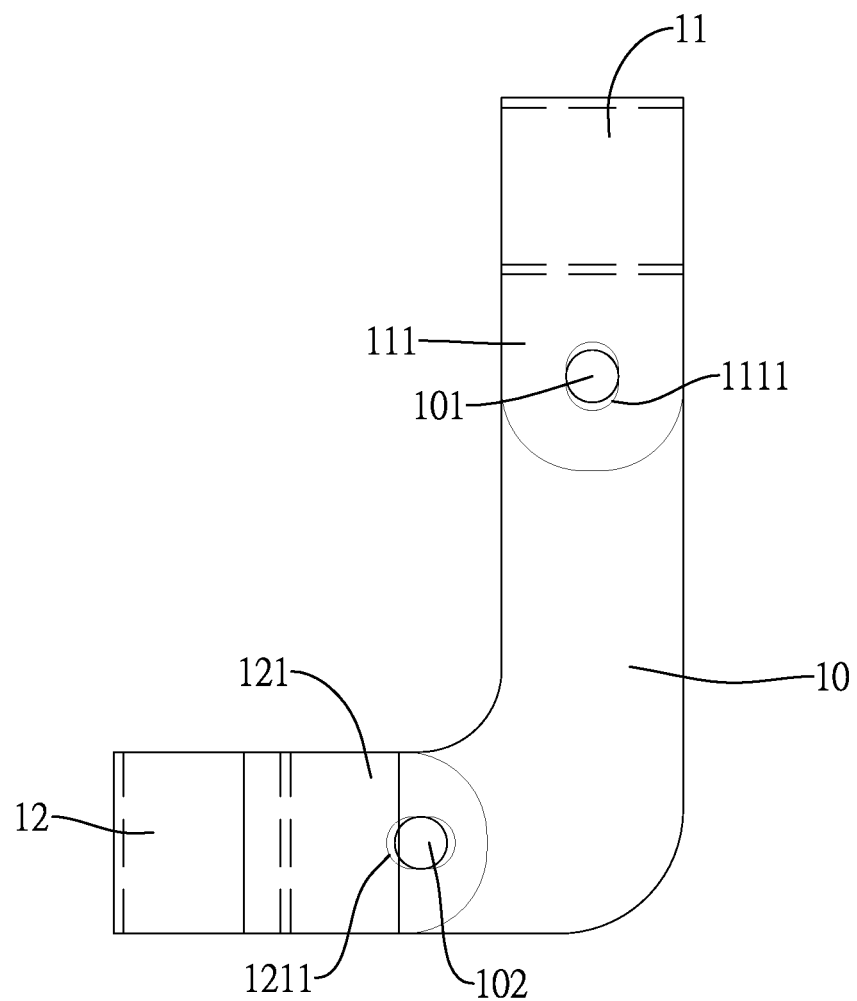
FIG. 11 is a front view of FIG. 10.
Figure 12:
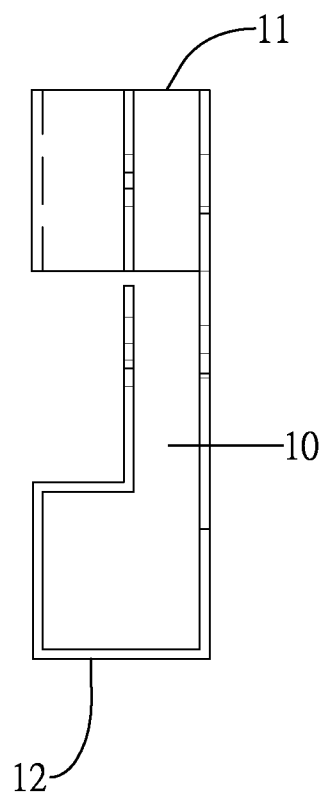
FIG. 12 is a lateral view of FIG. 10.
Figure 13:
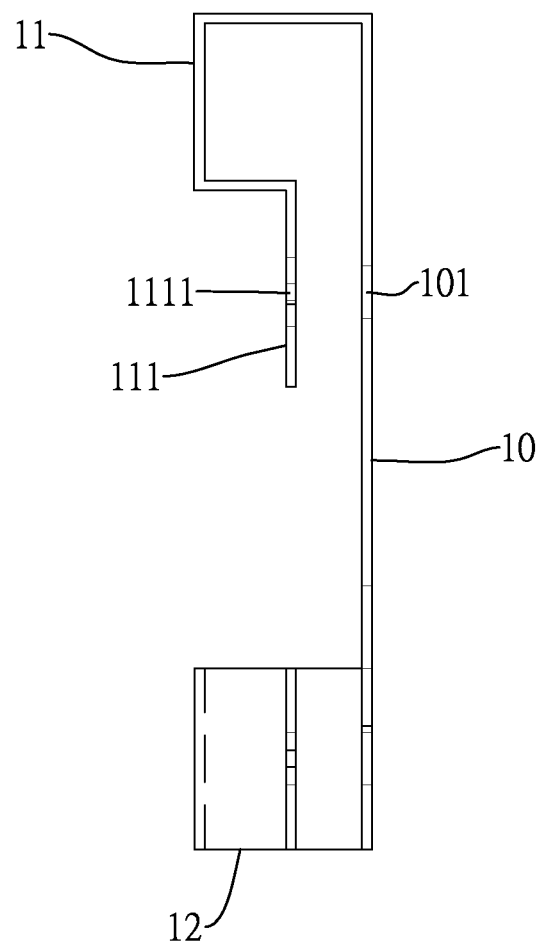
FIG. 13 is an upward view of FIG. 10.

Please refer to FIGS. 5 to 8 for the three-dimensional view, front view, right lateral view, and upward view of the embodiment of present invention; and also FIG. 9 for the schematic drawing. The pipe connector 1 of the embodiment comprises one main body 10, one first gripper 11, and one second gripper 12. Wherein the first gripper 11 is installed on one end of the main body 10 to grip one pipe P1; the second gripper 12 is installed on the other end of the main body 10; and first gripper 11 and second gripper 12 face different directions.

The embodiment overcomes the existing problems of the prior art and discloses a pipe connector which does not require to be designed and manufactured with corresponding quantity of pipes. The trouble of material preparation can be reduced; also it reduces manufacturing cost and inventories.

As shown in FIG. 9, first gripper 11 and second gripper 12 keep the gripped two pipes P1 and P2 facing different directions, to match up with pipeline design and installation.

Further, the include angle of axis of first gripper 11 and second gripper 12 is 90 degree; so that the gripped pipes P1 and P2 perpendicular to each other.

Moreover, as shown in FIG. 9, the first gripper 11 is arc-shaped and one lug 111 extends from its end; the lug 111 is with one opening 1111. The arc shape allows first gripper 11 conform to the shape of pipe for gripping. In addition, one fixation element (not shown in figure) can be used to pass through opening 1111 to fasten to corresponding opening 101 on main body 10. This way makes sure first gripper 11 grip the pipe P1 securely and not loose. Similarly, second gripper 12 is arc-shaped and one lug 121 extends from its end; the lug 121 is with one opening 1211 to allow one fixation element (not shown in figure) to pass through and fasten to corresponding opening 102 on main body, resulting in second gripper 12 securely grip pipe P2.

Figure 14:
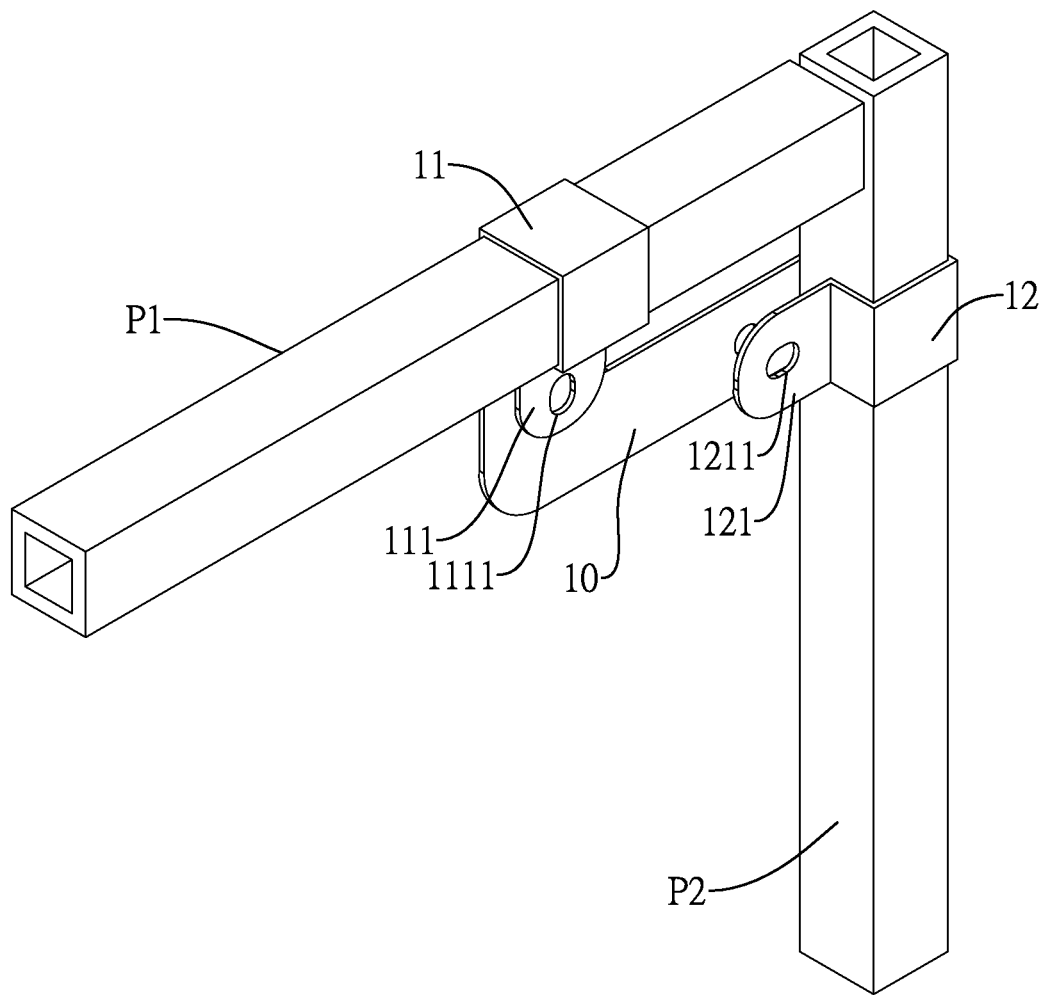
FIG. 14 is the schematic drawing of FIG. 10 adopting a square pipe.

Moreover, first gripper 11 and second gripper 12 can be as shown in FIGS. 10 to 13 to be polygonal (the figure shows a quadrilateral) to conform to the polygonal shape of pipes to achieve the purpose of gripping polygonal pipe P3 and P4 (as shown in FIG. 14).

Figure 1:
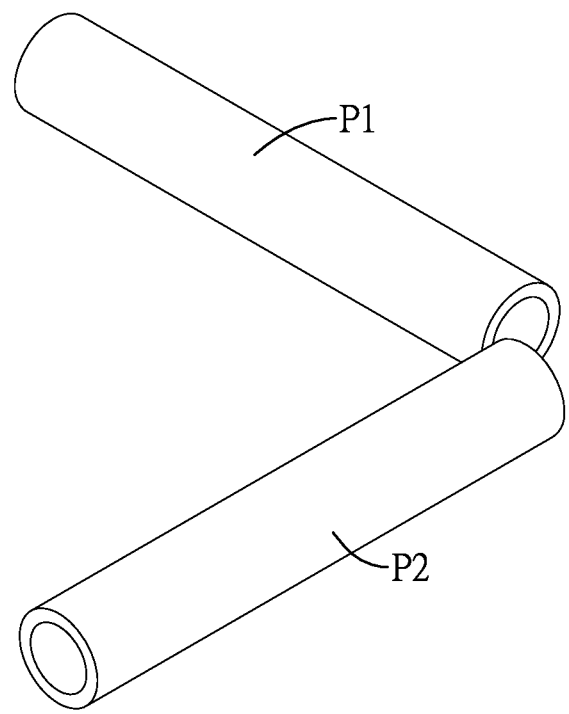
FIG. 1 is a schematic drawing of positions of two pipes of prior art to be arranged to be perpendicular to each other.
Figure 2:
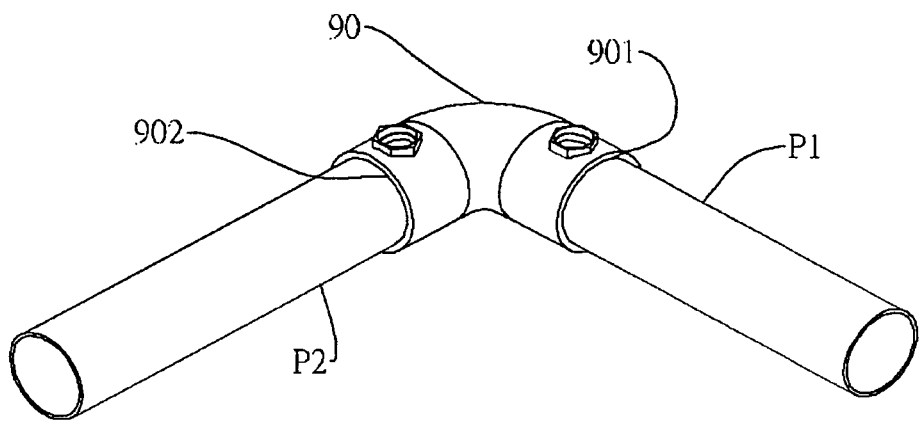
FIG. 2 is a three-dimensional view of pipes connected by specific pipe connector.
Figure 3:
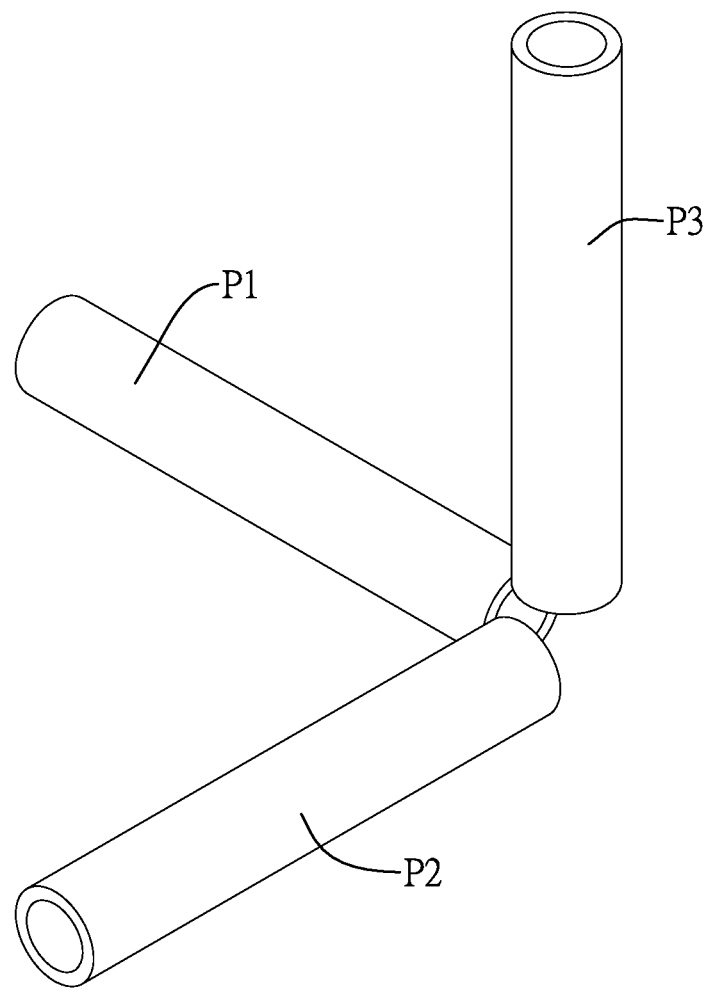
FIG. 3 is a schematic drawing of desired position arrangement of three pipes of the prior art.
Figure 4:
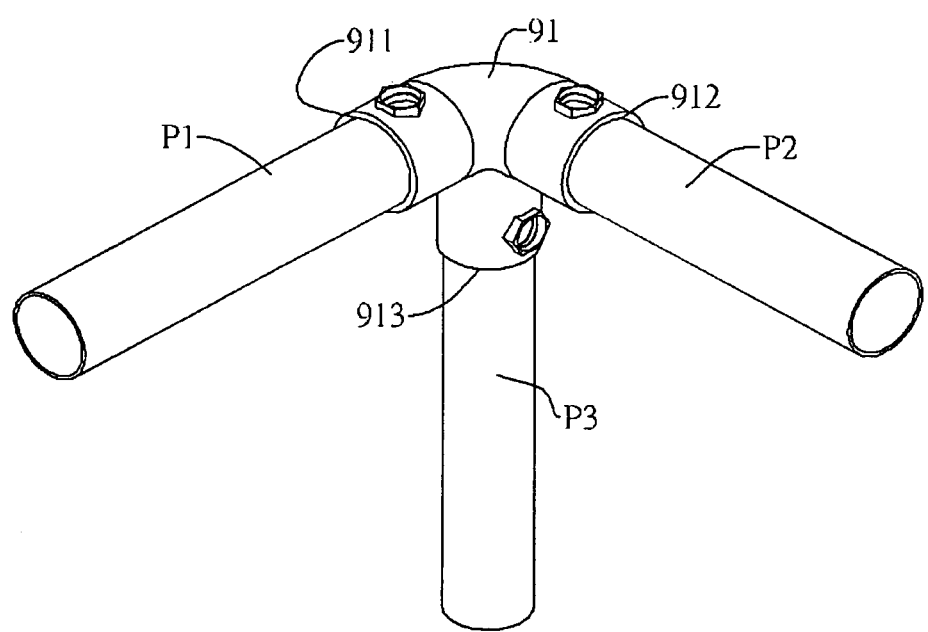
FIG. 4 is a three-dimensional view of pipes connected by specific pipe connector as shown in FIG. 3.
Figure 5:
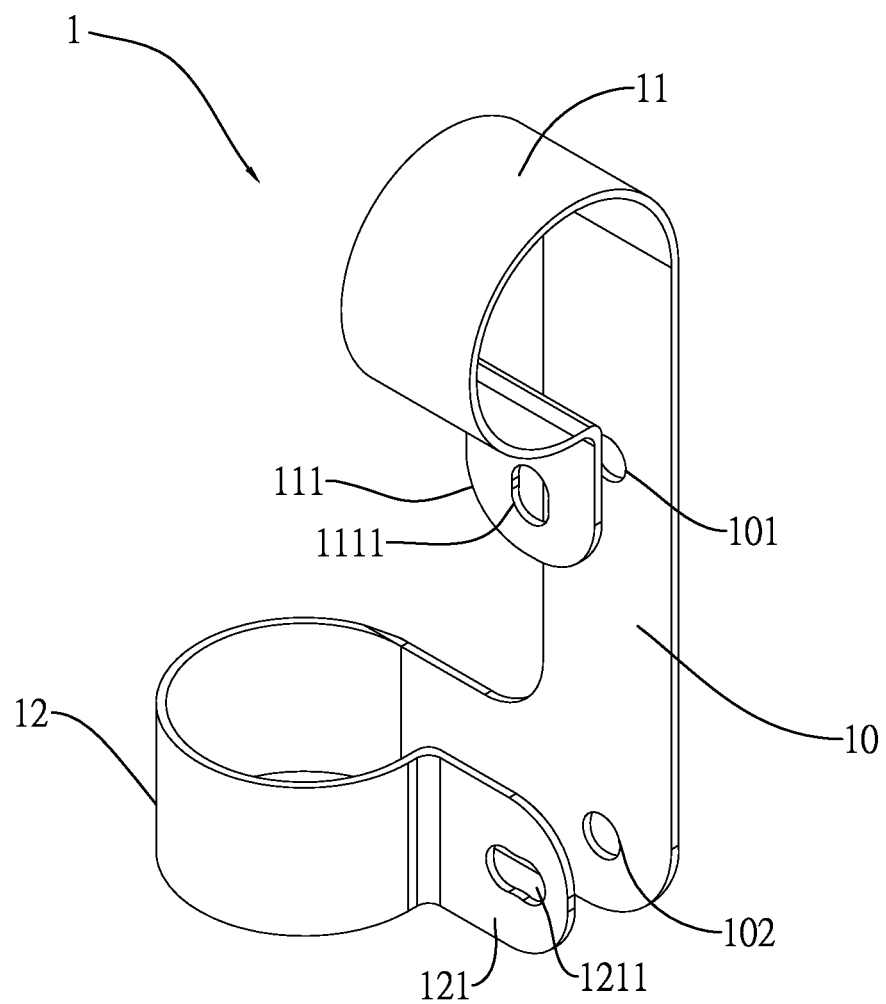
FIG. 5 is a three-dimensional view of an embodiment of present invention.
Figure 6:
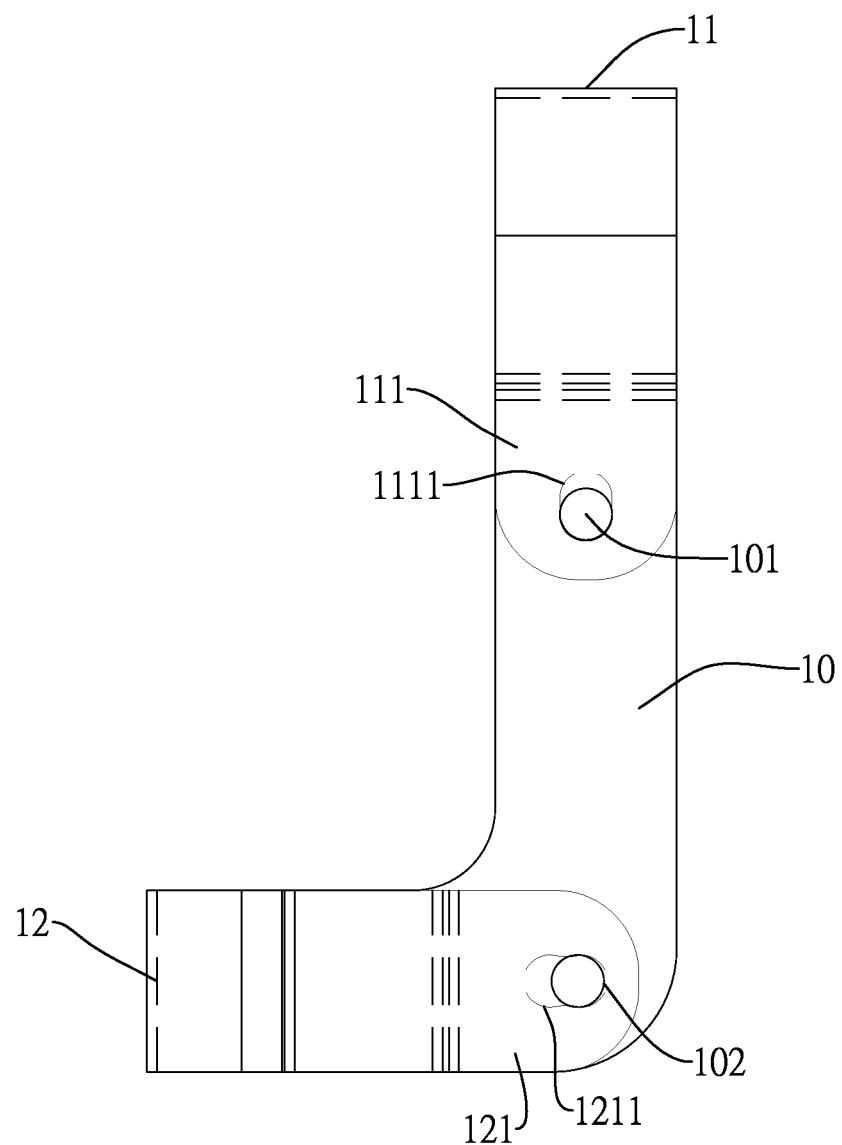
FIG. 6 is a front view of an embodiment of present invention.
Figure 7:
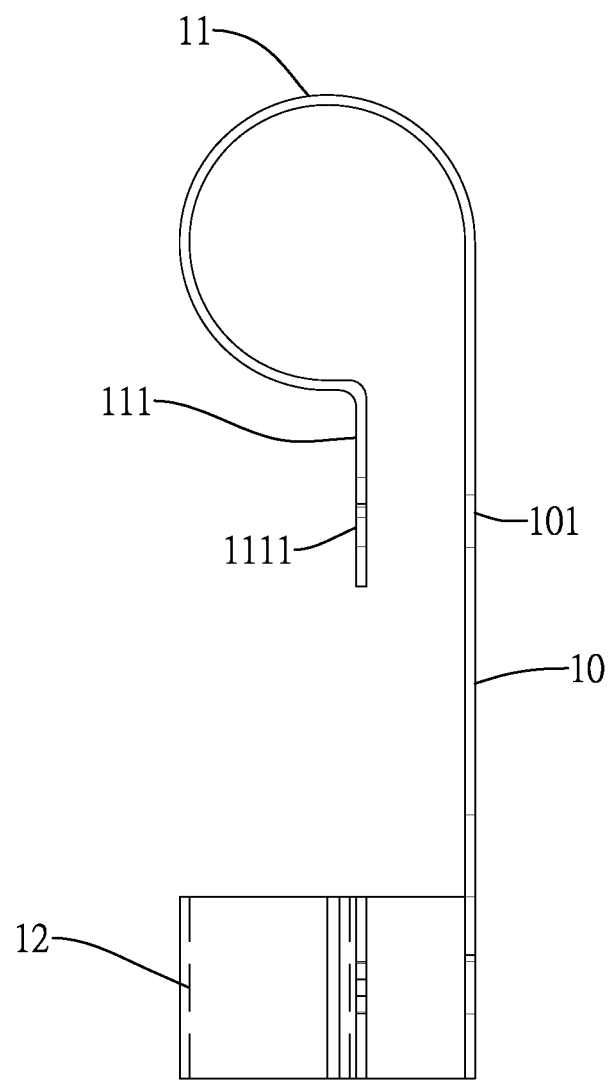
FIG. 7 is a lateral view of an embodiment of present invention.
Figure 8:
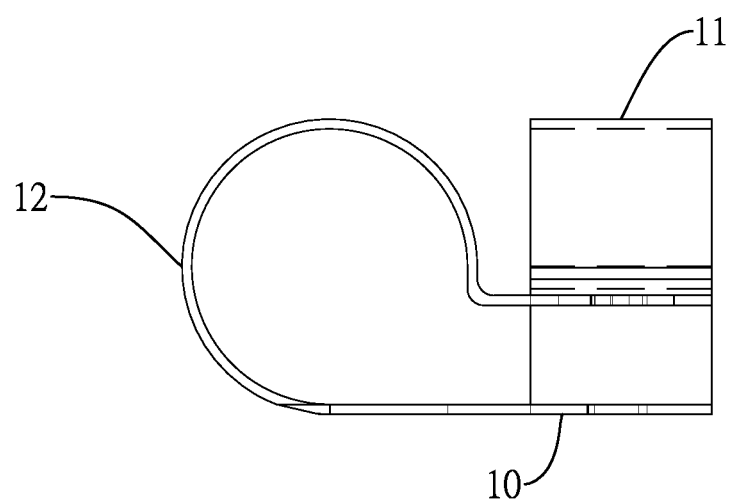
FIG. 8 is an upward view of an embodiment of present invention.

Moreover, as shown in FIG. 6, the main body 10 can be L-shaped and the first gripper 11 and second gripper 12 be respectively installed on the two ends of the L-shaped main body. First gripper 11 and second gripper 12 are formed curling upward from the two ends of the L-shaped body. This is easier for production and saves the expense of manufacturing, and also improves convenience.

Figure 15:
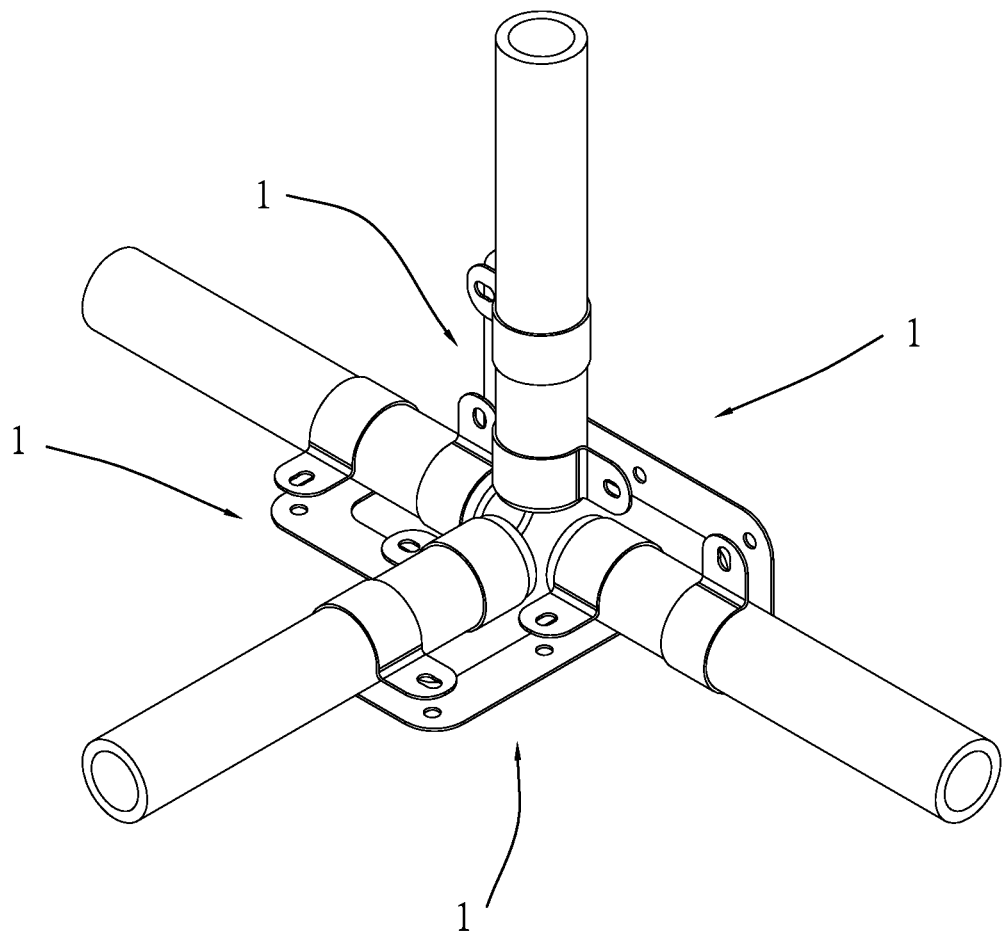
FIGS. 15 to 20 are the three dimensional-views of an embodiment of present invention which connects multiple pipes.
Figure 16:
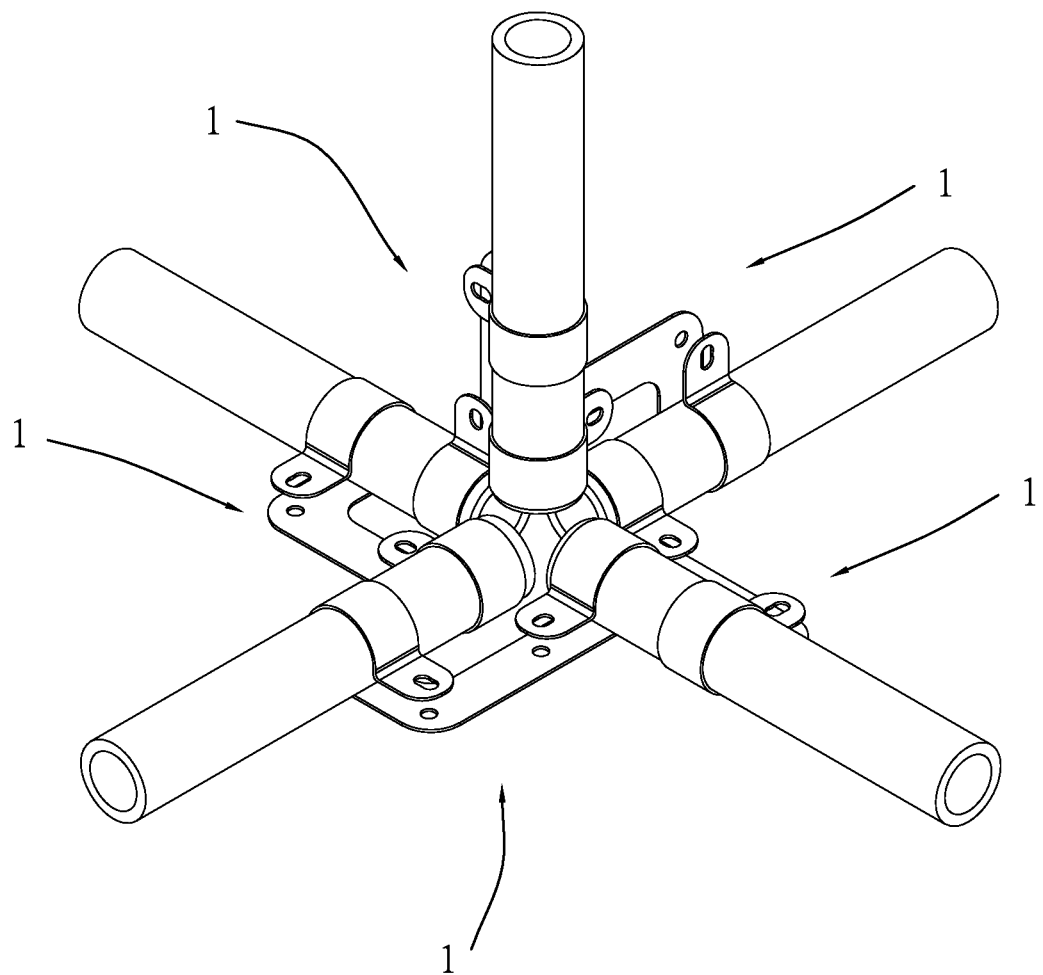
Figure 17:
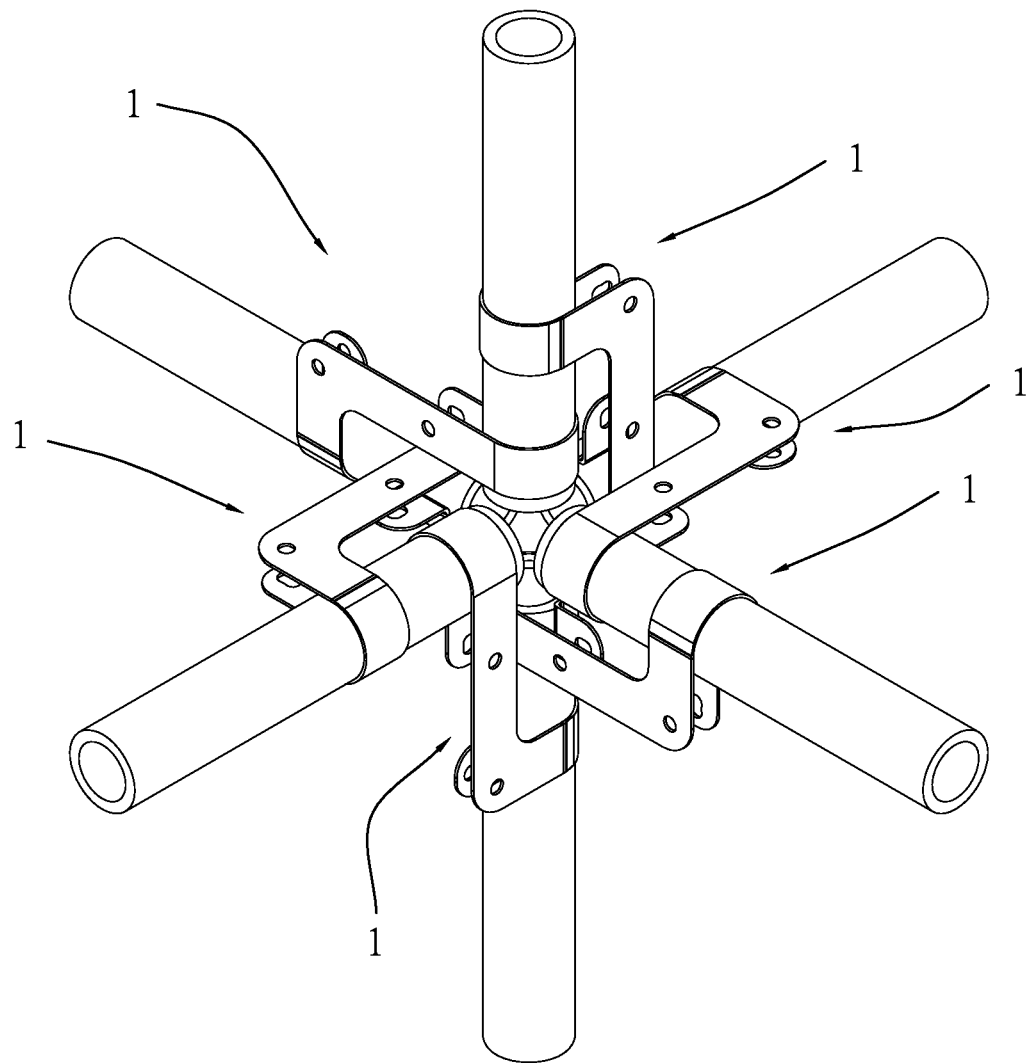
Figure 18:
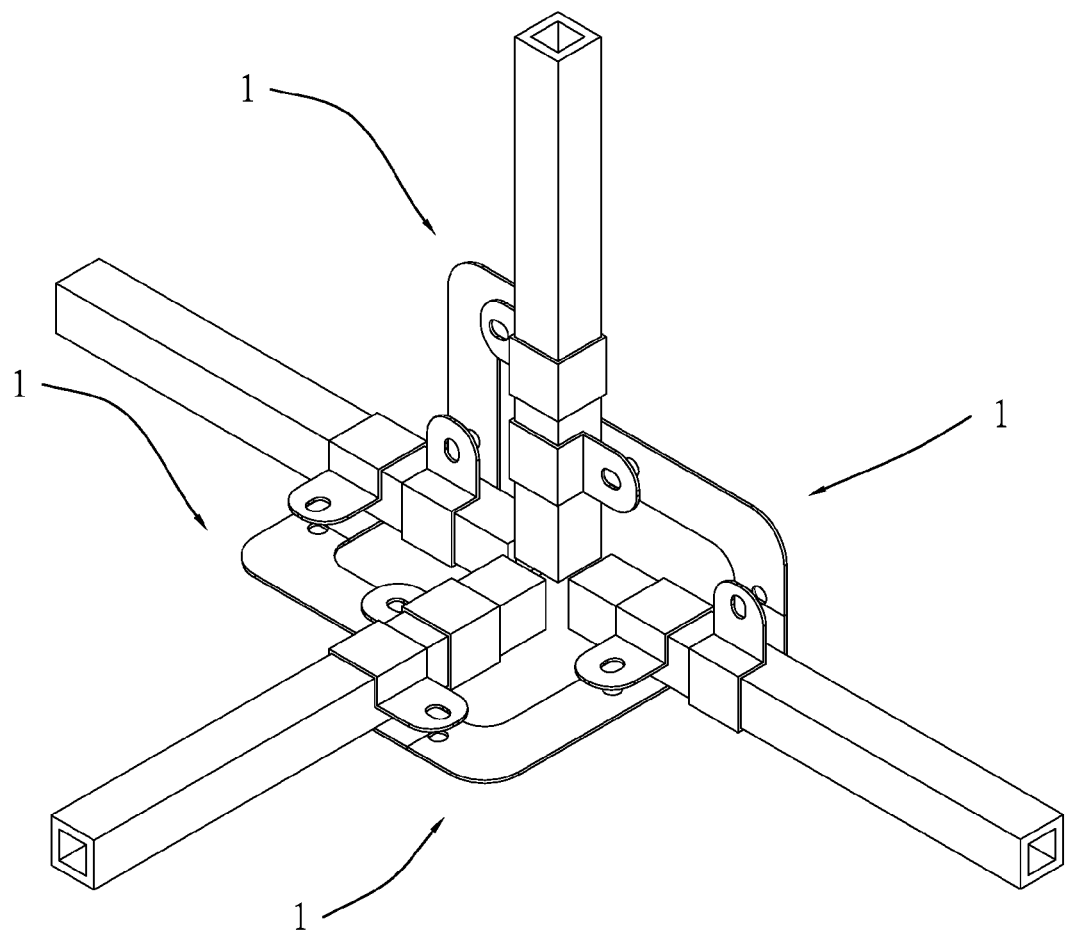
Figure 19:
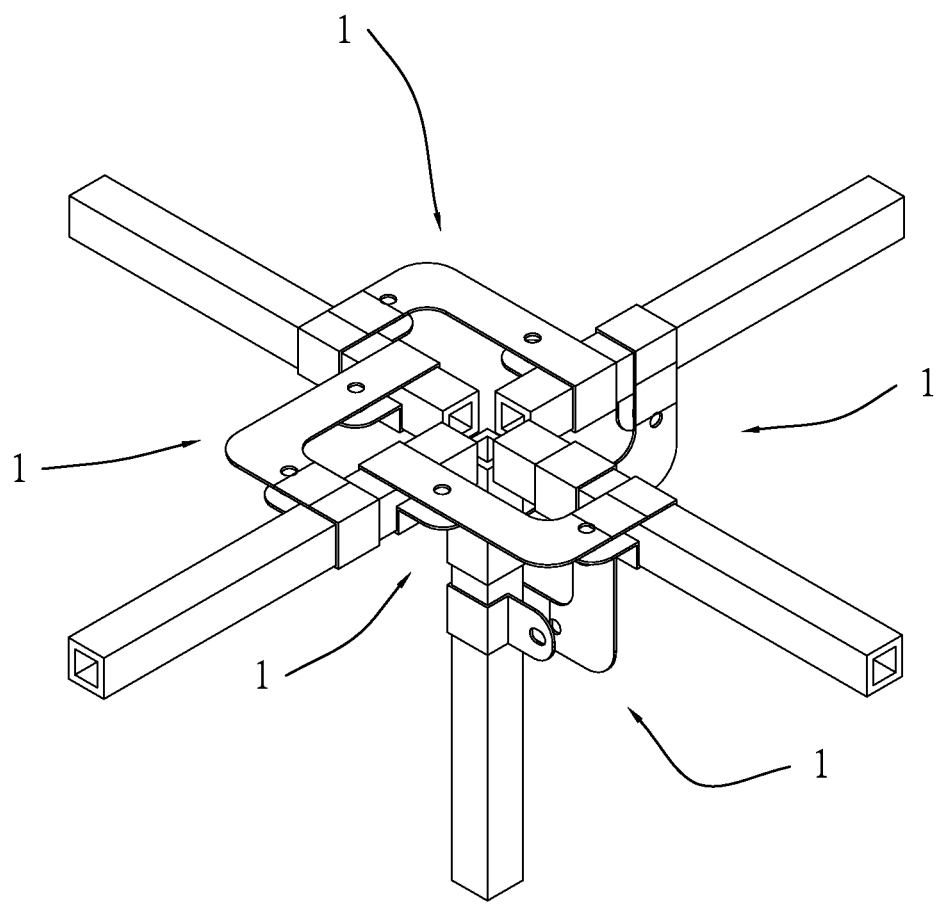
Figure 20:
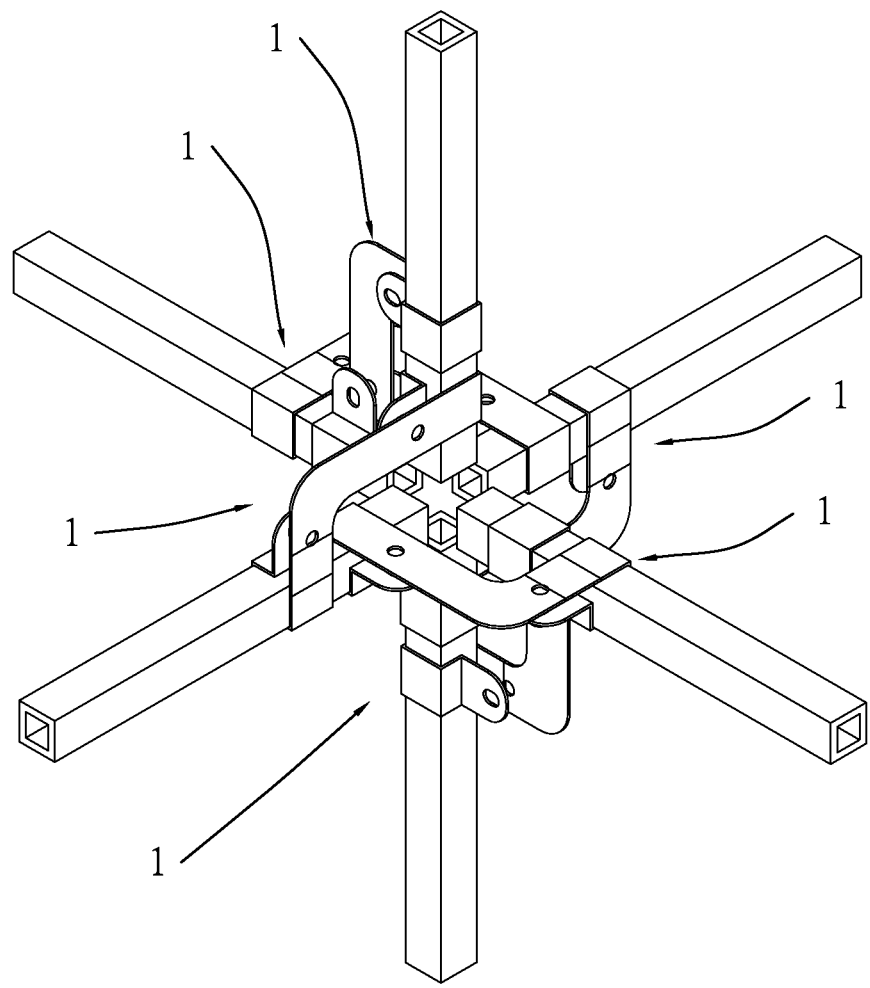

Moreover, when there are three or more pipes to be gripped, two more of pipe connectors of the embodiment can be used to achieve the purpose of securing position of each pipe. FIGS. 15 to 17 demonstrate the three-dimensional views of combining 4, 5, and 6 circular pipes using multiple pipe connectors of the embodiment. In the other hands, FIGS. 18 to 20 demonstrate the three-dimensional views of combining 4, 5, and 6 square pipes using multiple pipe connectors of the embodiment. From these figures, it can be proved and concluded that the embodiment is applicable for connecting multiple pipes. Therefore, it is easier and more convenient for the constructors when preparing the material.

Although the present invention has been explained in relation to its preferred embodiment, it is to be understood that many other possible modifications, additions and alterations can be made to the invention by one skilled in the art without departing from the spirit and scope of the invention as hereinafter claimed.

What is claimed is:

1. A pipe connector for connecting two pipes, comprising:
   a flat plate main body with a first opening at one longitudinal end and a second opening at the opposite longitudinal end;
   a first gripper formed on the one longitudinal end of the main body;
   a second gripper formed on the opposite longitudinal end of the main body,
   wherein the main body, the first gripper, and the second gripper are formed from a single monolithic structure,
   a longitudinal axis of the first gripper is positioned in a direction different from a longitudinal axis of the second gripper,
   each of the first and second grippers is shaped so as to conformingly surround an outer surface of a corresponding pipe inserted therethrough, and
   each of the first gripper and the second gripper extends from the main body and has a lug formed on an outer end thereof, the first gripper lug and the second gripper lug each having an opening positionally aligned with the first and second openings, respectively, on the main body so as to each receive and fixedly position a fastener therebetween.

2. The pipe connector as claimed in claim 1, wherein the longitudinal axis of the first gripper intersects the longitudinal axis of the second gripper and forms an acute, obtuse or right angle therebetween.

3. The pipe connector as claimed in claim 1, wherein the first gripper is arc-shaped.

4. The pipe connector as claimed in claim 1, wherein the second gripper is arc-shaped.

5. The pipe connector as claimed in claim 1, wherein the first gripper is polygonal-shaped.

6. The pipe connector as claimed in claim 1, wherein the second gripper is polygonal-shaped.

7. The pipe connector as claimed in claim 1, where in the main body is L-shaped along a plane of the flat plate main body.

8. The pipe connector as claimed in claim 7, wherein the first gripper and second gripper are formed on opposite ends of the L-shaped main body.

9. The pipe connector as claimed in claim 7, wherein the first gripper is formed curling upward from one end of the L-shaped main body.

10. The pipe connector as claimed in claim 7, wherein the second gripper is formed curling upward from one end of the L-shaped main body.

* * * * *